Sept. 14, 1954 R. W. TRIPP 2,688,896
NAVIGATION INSTRUMENT
Filed April 20, 1950 4 Sheets-Sheet 1
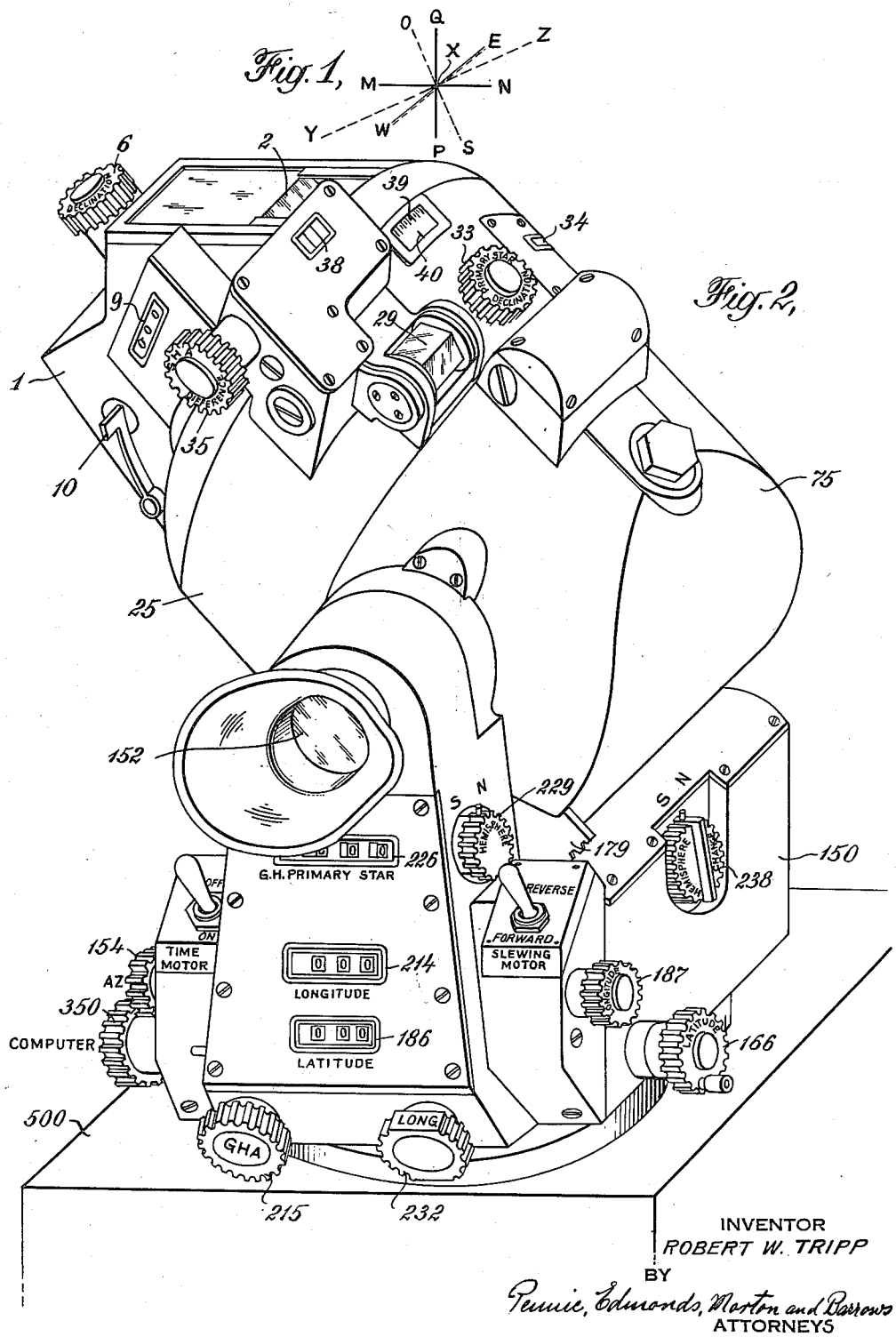
INVENTOR
ROBERT W. TRIPP
BY
Pennie, Edmonds, Morton and Barrows
ATTORNEYS Sept. 14, 1954      R. W. TRIPP      2,688,896

NAVIGATION INSTRUMENT

Filed April 20, 1950      4 Sheets-Sheet 2

INVENTOR
ROBERT W. TRIPP
BY Pennie, Edmonds
Morton and Barrows
ATTORNEYS

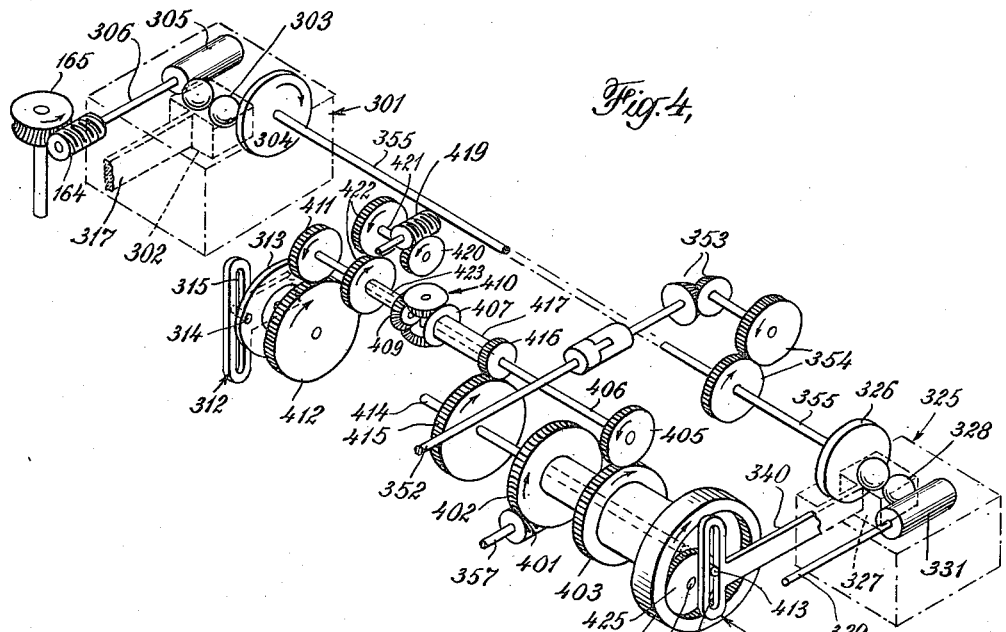
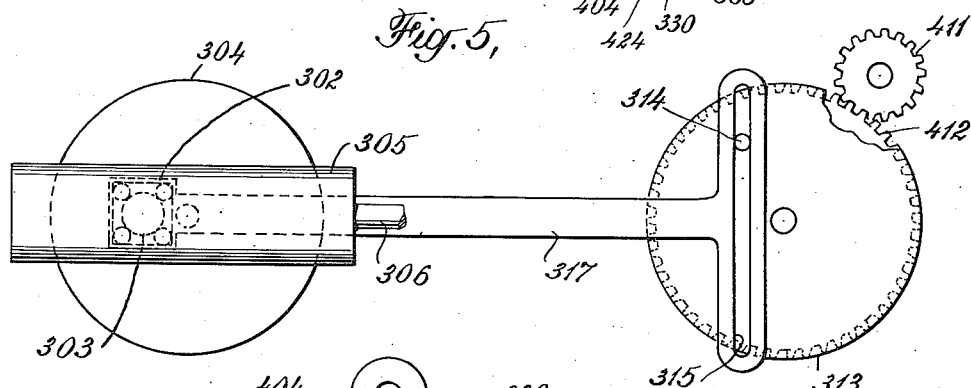
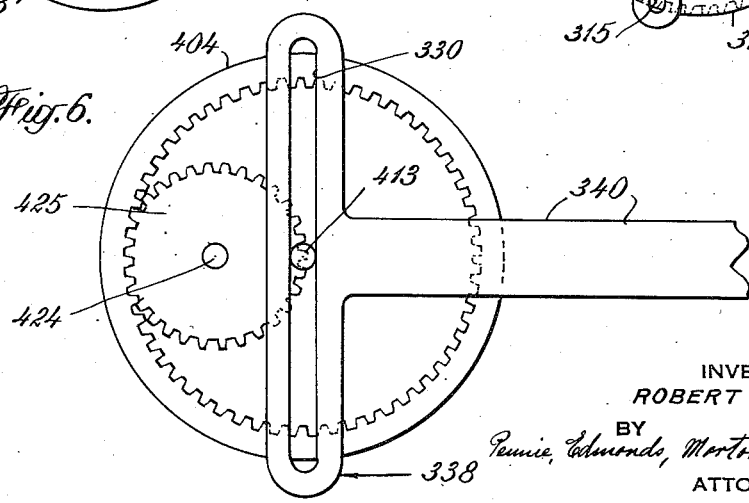
INVENTOR
ROBERT W. TRIPP
BY
Pennie, Edmonds, Morton and Barrows
ATTORNEYS Sept. 14, 1954     R. W. TRIPP     2,688,896
NAVIGATION INSTRUMENT Filed April 20, 1950                               4 Sheets-Sheet 4

*Fig. 7.*

$LHA' = 0°$
$LAT' = 90°$

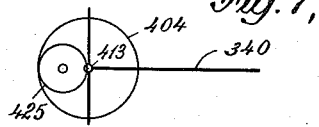

$LHA' = 0°$
$LAT' = 0°$

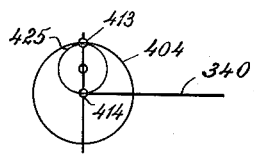

$LHA' = 0°$
$LAT' = 180°$

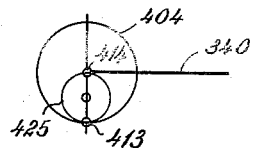

*Fig. 8.*

$LHA' = 45°$
$LAT' = 90°$

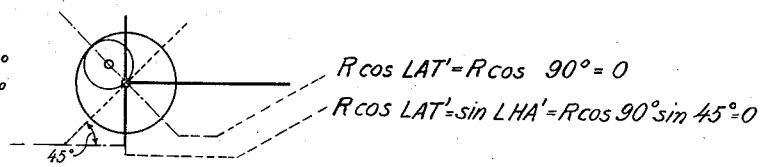

$R \cos LAT' = R \cos 90° = 0$
$R \cos LAT' \cdot \sin LHA' = R \cos 90° \sin 45° = 0$ $LHA' = 45°$
$LAT' = 45°$

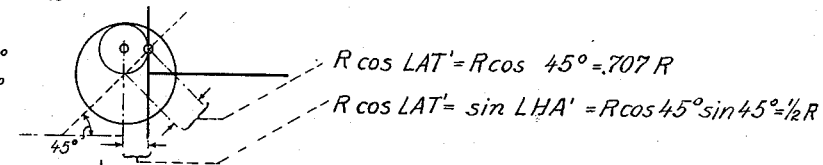

$R \cos LAT' = R \cos 45° = .707 R$
$R \cos LAT' \cdot \sin LHA' = R \cos 45° \sin 45° = \frac{1}{2} R$ $LHA' = 45°$
$LAT' = 135°$

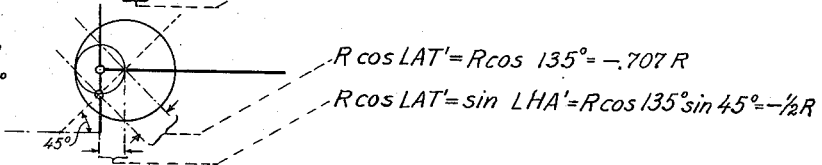

$R \cos LAT' = R \cos 135° = -.707 R$
$R \cos LAT' \cdot \sin LHA' = R \cos 135° \sin 45° = -\frac{1}{2} R$ $LHA' = 45°$
$LAT' = 315°$

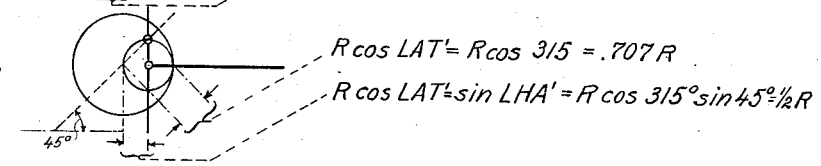

$R \cos LAT' = R \cos 315 = .707 R$
$R \cos LAT' \cdot \sin LHA' = R \cos 315° \sin 45° = \frac{1}{2} R$

*Fig. 9.*

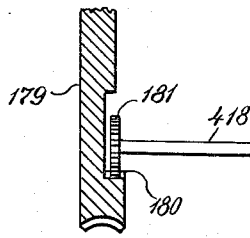
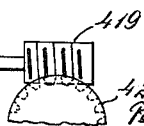

INVENTOR
ROBERT W. TRIPP
BY
Pennie, Edmonds, Morton and Barrows
ATTORNEYS

Patented Sept. 14, 1954

2,688,896

UNITED STATES PATENT OFFICE 2,688,896

NAVIGATION INSTRUMENT

Robert W. Tripp, Bronxville, N. Y., assignor to Farrand Optical Co., Inc., a corporation of New York Application April 20, 1950, Serial No. 156,966

16 Claims. (Cl. 88—2.7)

This invention relates to an instrument for celestial navigation adapted to take simultaneous sights on two heavenly bodies, and more particularly to means for achieving a simultaneous alignment between elements of the instrument and the two lines of sight from the instrument to the chosen bodies.

In an instrument constructed according to the invention, simultaneous sights are taken on two stars by means of telescopes whose axes are inclined to each other by the angle determined by the hour angle and declination differences of the two selected stars. Given Greenwich time, the declinations and the instantaneous Greenwich hour angles of the chosen stars, and the horizontal plane at the observer's station, alignment of the two telescopes' axes (i. e. of the optical axes thereof in their object spaces) with the lines of sight from the observer's station to the selected stars permits inference of the latitude and longitude of the observer's station.

These are the data required for a determination of position by the traditional methods of navigation. In the instrument of the present invention, however, sights on the two stars are taken simultaneously, instead of one after another as with the traditional sextant, and the computation of the observer's position from the observed angular positions of the two stars is performed automatically by the instrument in the course of the alignment process by which the sights are taken. Thus the fix can be read off in latitude and longitude from counters provided for that purpose as soon as the sights are taken. An instrument according to the invention may therefore be referred to as a multiple-star sextant, although it is not limited to the measurement of bodies within 60 degrees of the horizon.

The invention, together with the principles of position determination on which it rests, will now be described together with an illustrative embodiment by reference to the accompanying drawings in which Fig. 1 is a representation of the two coordinate systems simulated in the instrument with reference to which the observer's position is located.

Fig. 2 is a perspective view of a multiple-star sextant embodying the invention.

Fig. 4 is an enlarged view of the elements shown in Fig. 2 which comprise one form of computer employed according to the invention to achieve simultaneous alignment of the axes of the two telescopes in the instrument with the lines of sight from the instrument to the two chosen stars.

Fig. 5 is a schematic representation of the azimuth Scotch yoke and azimuth ball and disk integrator of the computer of Fig. 4.

Fig. 6 is a schematic representation of the latitude Scotch yoke of the computer of Fig. 4.

Fig. 7 is a set of simplified representations of the latitude Scotch yoke of Fig. 6 for various values of the latitude setting of the instrument.

Fig. 8 is a set of representations similar to those of Fig. 7 but including variation in the local hour angle setting as well as in the latitude setting, and Fig. 9 is a detailed schematic view of a rack and pinion linkage which transmits to the computer of Fig. 4 the position of the turret mount section about the latitude axis of the instrument.

Figure 3:
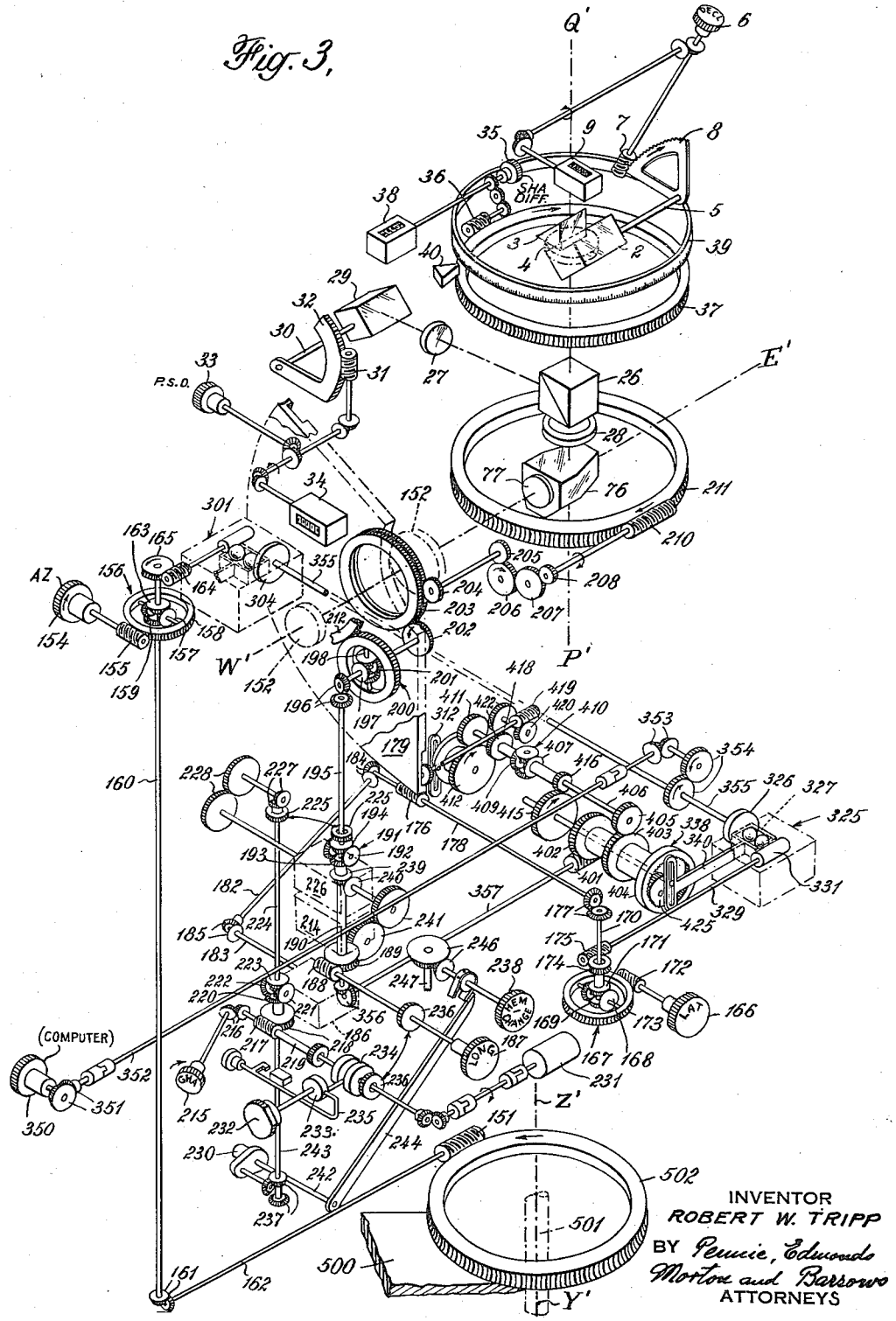
Fig. 3 is a diagram showing schematically the principal components of the instrument of Fig. 2.

The navigational problem solved by the instrument of the present invention can be stated analytically as follows: Referring to Fig. 1, there can be assumed at any observer's station X on the surface of the earth two coordinate systems with reference to which the location of celestial bodies may be measured. The polar system, shown in solid lines in Fig. 1, comprises the axis PQ parallel to the polar axis of the earth, EW, the true east-west direction, and MO which is perpendicular to PQ and EW. MO is accordingly parallel to the earth's equatorial plane. The axis PQ is parallel to the polar axis of the celestial sphere, and the axes EW and MO define a plane parallel to the celestial equator. These may be assumed to coincide respectively with the polar axis and equatorial plane of the celestial sphere, since all distances within the earth and indeed within the orbit of the earth's rotation about the sun are negligible by comparison to the dimensions of the celestial sphere.

The horizontal system shown in dotted lines in Fig. 1 is composed of NS, the true north-south direction at X, EW, the true east-west direction, and YZ, the vertical or azimuth axis. NS and EW form the azimuth plane, tangent to the earth's surface at X. The axis EW is common to both systems.

The observer's meridian is in the plane formed by YZ, PQ, NS, and MO. This plane is the zero local hour angle meridian, with respect to which the local hour angles of the stars are measured.

The traditional celestial navigation performed at sea consists in the measurement, in the horizontal coordinate system, of the altitudes above the azimuth plane of two or more selected bodies. From these altitudes and from the Greenwich hour angles associated with the bodies at the times of their observation, separate lines of position associated with each body may be computed and plotted, to give from their intersection a fix for the observer.

For an observer's station undergoing rapid motion, as in the case of an aircraft, this method is entirely too slow, requiring the collation of observations taken at points which are widely separated in view of the speed of the aircraft, and an amount of computation which is burdensome to the observer.

The present invention does away with all need for computation and permits the taking of a fix in a matter of seconds by the mere alignment of the two telescope axes with the lines of sight to the selected stars. As will be more fully described below, the two telescopes have in a preferred embodiment of the invention a common eyepiece, and the process of alignment consists in bringing the images of the two selected stars to superposition in the center of the common eyepiece. Elements in the instrument simulate two of the three coordinate axes of each of the two sets of coordinates, and alignment of the instrument produces parallelism between each of these elements and its counterpart in the geometry of space, as well as parallelism of the two telescope axes with the lines of sight from the observer's station to the two stars.

Parallelism in each case between the two elements of the instrument and the two counterpart axes of coordinates implies parallelism between the third counterpart axis of coordinates and the element of the instrument corresponding thereto. For this reason elements in the instrument corresponding to the third axis of coordinates in each system are unnecessary.

When such parallelism has been achieved, the latitude of the observer's position is determined directly as the angle between the elements of the instrument corresponding to the azimuth plane and the element corresponding to the polar axis PQ. Longitude is determined from the relation between local hour angle and Greenwich hour angle expressed in the equations $LHA = GHA -$ west longitude of observer (1)

or $LHA = GHA +$ east longitude of observer (2)

The local hour angles (LHA's) of the chosen stars may be read from the instrument as the angle between the zero local hour angle meridian occupied by the plane of YZ, PQ, NS, and MN and the plane determined by PQ and the line of sight to the star in question.

It has been proposed heretofore to construct a sextant or other navigation instrument employing two telescopes for simultaneous sighting of two stars. The problem in constructing a practical instrument on this principle is that of bringing the telescopes into actual simultaneous alignment with the lines of sight from the observer's position to the two selected stars.

The problem is not of obvious solution because the orientation of the two lines of sight from the observer's position to the selected stars will in general have a random relation to the axes of rotation of the physical device, however these are chosen. That is to say, the sextant must possess three rotational degrees of freedom for rotation about three axes in order that two telescope axes having an arbitrary fixed inclination to each other at the angle determined by the tions within the hemisphere which are consistent with their inclination to each other.

If the optical axis of one telescope is brought into parallelism with the line of sight from the observer's position to one of the stars, called the primary star, that star will appear at the center of the field in the eyepiece. Since the optical axes of the two telescopes are inclined to each other at an angle determined by the hour angle and declination differences of the two selected stars, a rotation of the other telescope about the line of sight to the primary star will bring the optical axis of the other telescope (the "secondary star telescope") into parallelism with the line of sight from the observer's position to the secondary star. In an instrument in which the two telescopes have a common eyepiece, this condition will be manifested by a superposition of the two star images at the center of the eyepiece field.

When the optical axis of the primary star telescope is initially brought into parallelism with the line of sight to the primary star, the optical axis of the primary star telescope will have in general a random orientation with respect to the three axes of rotation of the sextant. Accordingly, a rotation of the secondary star telescope about the optical axis of the primary star telescope, as is required in order to keep the image of the primary star in the center of the eyepiece field, requires in general simultaneous rotations of the sextant about its three mechanical axes at relative rates which it is substantially impossible for an observer to predict and effect by manipulation of direct input controls geared to the portions of the sextant rotating about these axes.

Depending upon the coordinate axes of rotation built into the sextant, the relative rates of rotation about the three axes required to keep the primary star image in the center of the eyepiece field will be established by one or another set of three simultaneously differential equations whose solution differs from point to point over the solid angle which can be scanned by the sextant.

The present invention provides a method and means for effecting an organized rotation of the separate portions of the sextant about their respective mechanical axes so that the operator by observing the motions of the primary and secondary star images in the eyepiece and by operating one (or at most two) input controls can bring the two star images into superposition in the center of the eyepiece field. In embodiments of the invention requiring manipulation of two controls, their separate effects on the positions of the images are unmixed so that the operator readily learns to associate one control with one star image and the other control with the other.

This is achieved by building into the sextant a computer which generates the necessary relative rates of rotation, and which applies the rates so generated to the separate drive mechanisms so that the separate portions of the sextant are rotated about their respective axes at these required rates. For purposes of illustration there will be described as an embodiment of the invention an instrument in which the operator manipulates two input controls during the alignment procedure, i. e. to achieve a rotation of the secondary star telescope axis about the axis of the primary star telescope.

General description of instrument

Referring to Fig. 2, the instrument is divided into four main sections. They are the upper turret 1, lower turret 25, turret mount section 75 and base support section 150.

The instrument, through the base support section, rests upon a stabilizer 500. The stabilizer is maintained in the horizontal plane by mechanism not forming part of the invention, and includes a fixed perpendicular shaft 501 (Fig. 3) which is therefore maintained vertical. The base support section is journaled on this shaft to permit rotation of the instrument in azimuth.

The turret mount section 75 is journaled in hollow trunnion bearings forming part of the base support section for rotation with respect to the base support section about an azis E'W' (Fig. 3) perpendicular to the shaft 501 and its axis Y'Z'. When the instrument is aligned, the axis E'W' in the instrument coincides with the east-west direction EW at the observer's position. The stabilizer maintains the axis Y'Z' of the shaft 501 at all times parallel to the axis YZ of Fig. 1. In the following description, the prime sign indicates that the component or quantity so designated is an element of the instrument, or is measured with reference to the structure of the instrument rather than to the coordinates of space. Upon alignment of the instrument the primed quantities become identical to unprimed quantities, and primed components become parallel to unprimed components.

The upper turret is journaled in bearings of the lower and the lower in bearings of the turret mount section for rotation of both with respect to the turret mount section and of each with respect to each other about an axis P'Q' in Fig. 3 (which is perpendicular to the E'W' axis of rotation of the turret mount section). When the instrument is aligned, the axis P'Q' is parallel to the polar axis of the earth.

The upper turret 1 contains the objective part of the secondary star telescope and means to introduce and record the declination of the secondary telescope axis, i. e. the complement of the angle between the secondary telescope axis and the instrument axis P'Q'. Declinations are measured from the axis P'Q' and hour angles are measured about it.

The employment of the upper turret for the secondary star telescope and of the lower turret for the primary star telescope is indicated by convenience only, as it simplifies the mechanism required for the introduction of the local hour angle of the primary star telescope into the computer. The roles of the turrets could be interchanged. In such case the alignment procedure to be described below would require rotation of the two turrets about the line of sight from the telescope whose objective is in the upper turret.

The upper turret is geared to the lower turret 25 so that an input applied at the appropriate point in the lower turret rotates the upper turret with respect to the lower turret. Such a rotation is a variation in hour angle difference of the telescope axes referred to the axis P'Q' of the instrument, and, when the instrument is aligned, these hour angles are the true hour angles of the lines of sight defined by the telescope axes in the celestial system of coordinates.

The lower turret 25 contains the objective part of the primary star telescope, means to introduce and record the declination of the primary telescope axis, and means to introduce and record the hour angle difference between the primary and secondary telescope axes. The lower turret is geared to the turret mount section 75 to permit rotation of the lower turret relative to the turret mount section. The axis of rotation of the upper turret relative to the lower coincides with the axis of rotation of the lower turret relative to the turrret mount section (the axis P'Q'), and, when the lower turret is rotated, it carries the upper turret with it. Such a rotation of the lower turret is a variation in the hour angles of the axes of the primary and secondary star telescopes referred to the axis P'Q', and, when the instrument is aligned, a variation of their true hour angles. The common axis of rotation of the upper and lower turrets relative to each other and to the turret mount section is indicated at P'Q' in Fig. 3 and will be referred to as the principal axis of the sextant.

The turret mount section 75 supports the turrets for rotation about the axis E'W' perpendicular to the principal axis P'Q' and to the azimuth axis Y'Z', and contains gearing for transmitting to the lower turret rotations corresponding to variations in longitude and Greenwich hour angle introduced in the base support section. These rotations turn the turrets with respect to the turret mount section about the principal axis P'Q'.

The axis of rotation E'W' of the turret mount section, defined by a pair of hollow trunnion bearings supported in the base support section 150, coincides with the axis of the common eyepiece for the two telescopes, the eyepiece optics being mounted in one of these trunnion bearings. Rotation of the turret mount section about the axis E'W', carrying the turrets with it, is a variation in latitude when the instrument is aligned. The various controls and counters shown in the perspective view of Fig. 2 will be identified later on in describing the operation of the sextant.

Referring to Fig. 3, the base support section 150 rests upon the stabilizer 500 for rotation about the vertical axis Y'Z' of the shaft 501. A worm wheel 502 affixed to the stabilizer 500 concentric with the shaft 501 permits the instrument to be rotated in azimuth by means of a drive applied to the engaging worm 151, forming part of the base support section. The base support section includes two uprights (not shown) in which are mounted the hollow trunnion bearings (not shown) which support the turret mount section. It also includes the gearing by which inputs are transformed into rotations of the base support section, turret mount section, and upper and lower turrets about the axes Y'Z', E'W' and P'Q', respectively, and the computer by which the relative rates of these rotations are correctly adjusted to each other to rotate the upper and lower turrets together about the primary telescope axis when this is aligned with the line of sight from the observer's position to the primary star. The base support section also includes a time motor for rotating the turrets about the axis P'Q' at the sidereal rate in order to compensate for the apparent rotation of the stars from east to west. A slewing motor permits rapid initial adjustment of the sextant about its longitude axis P'Q' in putting in the observer's dead reckoning position as a preliminary to the alignment procedure.

Optics

The optics of the embodiment of Figs. 2 and 3 will next be described. In the upper turret 1, which houses the objective system for the secondary star, a beam of parallel rays of light from the secondary star (considered as a point source) impinges upon the entrance prism 2. The entrance prism 2, which may conveniently take the form of a double dove prism mounted on a shaft 5 for rotation about an axis parallel to its reflecting faces and perpendicular to the principal axis P'Q' of the instrument, reflects the entering light into a path perpendicular to the axis P'Q' and into a reflecting head prism 3. The head prism 3 deflects the beam 90 degrees along the principal axis P'Q'. The light is then converged by objective lens 4 and transmitted to a beam splitter 26 in the lower turret. At the dividing surface of the beam splitter, the beam from the upper turret combines with that from the primary star objective 27. The combined light is diverged by a negative element 28 and transmitted to a roof prism 76 fixed in the turret mount section. The roof prism 76 reverts and deflects the light along the eyepiece axis E'W', where it comes to a focus on a reticle 77. The image there formed is viewed by the eyepiece 152. The eyepiece optics 152 are supported from the base support section inside a hollow trunnion bearing which supports the turret mount section.

In the lower turret 25 an entrance prism 29 similar to the entrance prism 2 of the upper turret is mounted on a shaft 30 for rotation about an axis perpendicular to the axis P'Q'. It deflects parallel light from the primary star through the objective 27 along a path perpendicular to the axis P'Q' into the beam splitter 26. The optical paths of the primary and secondary star telescopes are identical from the dividing surface in the beam splitter 26 to the eyepiece.

The primary and secondary star telescope axes (as those terms are used here in reference to the object space outside the entrance prisms 2 and 29) thus possess an orientation dependent upon the orientations of the entrance prisms, the turrets, the turret mount section and the base support section. As the upper turret rotates about the principal axis P'Q', the entrance prism 2 rotates with head prism 3 about the principal axis, thereby providing for change in hour angle of the secondary telescope axis. As the lower turret rotates about the principal axis, variation in hour angle of the primary star telescope axis is likewise effected. Rotation of the lower turret, since it effects a variation in the hour angle for both telescope axes, likewise provides for change in the longitude of the observer's position. Rotation of the entrance prisms 2 and 29 provides for variation in the declinations of the stars.

Gearing

The desired rotations of the sextant about the azimuth axis Y'Z', the eyepiece (latitude) axis E'W' and the principal (polar or longitude) axis P'Q' are transmitted from input controls through the gearing of the instrument. These rotations are transmitted both directly and through the computer. Direct rotations are effected in introducing the input data. The input data consist of declinations and hour angle difference of the primary and secondary stars and the Greenwich hour angle of the primary star at a known time instant, together with the observer's dead reckoning latitude and longitude position and appropriate north.

The rotations are transmitted by way of the computer during the alignment process which follows and which permits the determination of an accurate fix.

The gearing which leads to direct rotations about the three mechanical axes will be first described.

(a) Azimuth transmission

The instrument is established in the azimuth plane by the vertical shaft 501 of the stabilizer 500. Rotation of an azimuth knob 154 rotates the spider of a differential 156 by means of the worm 155 and worm wheel 158 attached to the spider 157. The spider 157 rotates the lower end gear 159 of the differential. End gear 159 is connected by a shaft 160 and a pair of bevel gears 161 and shaft 162 to the azimuth worm 151. Rotation of the worm 151 racks the instrument about the azimuth axis Y'Z', since the worm wheel 502 is fixed in the stabilizer. The upper end gear 163 of differential 156 leads to the computer, to be described below, but cannot drive it because of the blocking action of the worm 164 and worm wheel 165.

The stabilizer includes a compass of known type which maintains the eyepiece axis E'W' at least roughly in the east-west direction at the observer's station. If the compass is of magnetic type, the initial adjustment of the azimuth knob 154 will be to compensate roughly for the magnetic declination of the observer's position, which must be known to him.

(b) Latitude transmission

Rotation of the latitude knob 166 rotates the spider 168 of a differential 167 by means of a connecting worm 172 and worm wheel 173 pinned to the spider. Rotation of the upper end gear 171 is blocked by the worm 175 meshing with the connected worm wheel 174. Rotation of the knob 166 is accordingly passed to the lower end gear 169. A shaft 170 pinned to the lower end gear 169 passes up through the upper end gear 171 to drive the worm 176 via bevel gears 177 and shaft 178. The worm 176, journaled in the base support section, drives a sector 179 forming part of the turret mount section. This results in a rotation of the turret mount section about the eyepiece axis E'W', which coincides with the axis of rotation of the turret mount section in its trunnion bearings.

Rotation of the turret mount section about the eyepiece axis E'W' is a variation in latitude when the instrument is aligned. The shaft 178 carrying worm 176 is linked through shafts 182 and 183 and bevel gears 184 and 185 by bevel gearing to latitude counter 186. The counter is established to read zero when the turret mount section has rotated the axis P'Q' into a direction perpendicular to the azimuth axis Y'Z' in the base support.

(c) Joint rotation of the turrets about the principal axis

Rotation of the lower turret (and with it of the upper turret) about the principal or longitude axis P'Q' is effected from either one of two inputs in the base support section, each of which may be motor-driven or hand-driven.

These two inputs are added algebraically in a differential 191 from which a single output passes into the turret mount section where it drives the lower turret. One input, having a counter of its own marked "Greenwich Hour Angle Primary Star," is used for introducing the Greenwich hour angle of the primary star. The other, having a counter marked "Longitude," is used to introduce the observer's dead reckoning position. The counters are so adjusted so that when the meridian defined by P'Q' and the axis of the primary telescope is perpendicular to the latitude axis E'W', the sum of the Greenwich hour angle and longitude readings is zero in accordance with the requirements of Equations 1 and 2 for a local hour angle of zero. Conversely, if with a given rotation of the GHA input, the LONG input is rotated to give a LONG reading of zero, the meridian defined by P'Q' and the axis of the primary telescope will be inclined to the axis E'W' by an angle whose complement will be the reading of the GHA counter, as would be required for alignment of the instrument by an observer located on Greenwich meridian.

The longitude input transmission will be first considered.

(d) Longitude transmission

Rotation of the longitude knob 187 rotates worm 188. The meshing worm wheel 189 is connected via a hollow shaft 190 to the lower end gear 193 of a differential 191. Rotation of the lower end gear of this differential rotates the spider 192 to which is affixed a shaft 195, since rotation of the upper end gear is blocked at a worm 217 and motor 230 to be described below. Rotation of the worm 188 is therefore transmitted to the west end gear 197 of a differential 200 by means of the bevels 196. The differential 200, mounted like differential 191 in the base support section, has its spider 198 fixed against all but certain small rotations to be presently described so that rotation of the west end gear 197 drives through the planetary gears on the spider to rotate the east end gear 201. A spur gear 202, also mounted for rotation in the base support section, meshes with the east end gear 201, meshes with one half of a split floating ring gear 203. The ring gear 203 is mounted for rotation about the eyepiece axis E'W' of the turret mount section. Rotation of the ring gear 203 drives through a series of spur gears 204—208 to actuate the worm 210. The spur gears 204—208 are mounted for rotation in the turret mount section. Rotation of worm 210 rotates worm wheel 211 to which the lower turret is attached.

When sector 179 is rotated about the eyepiece axis E'W' by means of a latitude input applied at the worm 176, the worm 210 and worm wheel 211 would be actuated, resulting in a variation in longitude input, were it not for compensation introduced by means of a gear sector 212 mounted concentrically with the eyepiece axis E'W' and affixed to the sector 179. Without such compensation (i. e. without any differential action in the differential 200) a rotation of the sector 179 would carry the spur gear 204 with it bodily around the axis E'W'. This would result in a change in mesh between the spur gear 204 and the ring gear 203. Gear 204 would therefore rotate about its own axis, effecting a rotation of the worm wheel 211. The sector 212 however, when rotated by a rotation of sector 179, rotates the spider 198 of the differential 200 and hence the spur gear 202, by precisely the amount required to rotate the ring gear 203 about its own axis through the angle of rotation of the sector 179 itself, with which the turret mount section including the gears 204—208 moves. There is accordingly no change in mesh between the gears 204 and 203, and no variation in longitude is produced.

The longitude input is recorded on a counter 214 driven from a gear 239 pinned to the hollow shaft 190, via bevel gear 240 and spur gears 241. Reading of this counter is therefore unaffected by the action of differential 191.

(e) GHA primary star input

One of the inputs required in the alignment procedure, in addition to dead reckoning latitude and longitude positions, is the Greenwich hour angle of the primary star. Algebraic addition of the Greenwich hour angle of this star to the longitude of the observer's position gives the local hour angle of the primary star at the observer's position. Therefore, if the primary star telescope is to be directed at the primary star as the first step in the alignment process, the Greenwich hour angle of the primary star for a chosen time instant must be introduced into the sextant at that instant. The Greenwich hour angle of the primary star is set into the instrument manually by means of the GHA knob 215. Knob 215 drives the lower end gear 220 of differential 222 via a pair of bevels 216, the worm 217 and the worm wheel 218 which is affixed to the lower end gear 220. The spider 221 of differential 222 is fixed except as driven by the time motor 230 yet to be described. The planetary gears on spider 221 therefore transmit the rotation of the lower end gear 220 to the upper end gear 223 which is connected via a shaft 224 to the meshing spur gears 225 which feed into the upper end gear 194 of differential 191. The GHA rotation of knob 215 is communicated thence to the worm wheel 211 via the spider 192 of differential 191, shaft 195 affixed thereto and the gearing described under the heading "Longitude Transmission." A GHA primary star counter 226 is driven from the shaft 224 via bevel gears 227 and spur gears 228. Its reading is therefore likewise unaffected by action of the differential 191.

Motor drives

In addition to the manual controls, two motors are provided to effect rotation of the turrets about the principal axis P'Q'. The slewing motor 231 can, by means of a selector switch knob 232, feed in the values of GHA primary star or longitude for the dead reckoning position. The selector switch knob 232 rotates a cam 233 to which is connected a sliding clutch mover 234. By means of a plunger 235 the cam 233 may be locked in either of the positions for GHA and longitude drive. With the clutch mover to the left in Fig. 3, the slewing motor 231 drives the GHA input shaft 219 carrying worm 217. With the clutch mover to the right, the spur gears 236 engage, and the slewing motor drives the longitude input worm 188.

Rotation of the turrets about the longitude or principal axis P'Q' to compensate for the change of Greenwich hour angle with time is effected by a time motor 230, which feeds an input to the differential 191 via the differential 222. The time motor 230, supported on a rocking shaft 242, drives a shaft 243 through one or the other of the reversing bevel gears 237. The shaft 243 is pinned to the spider of the differential 222, also employed for manual adjustment of GHA'. The drive from the motor 230 therefore rotates the spider of differential 222. Since the lower end gears is blocked at the worm 217, this rotation is passed to the differential 191 and thence to the worm wheel 211 in the lower turret, via the route through which GHA of the primary star is introduced at the beginning of the alignment procedure. The motor 230 is controlled, by means of a tuning fork for example, to rotate the turrets about the principal axis at exactly the sidereal rate.

Primary and secondary star declinations and hour difference

The declinations of and the hour angle difference between the chosen primary and secondary stars are set into the upper and lower turrets as part of the initial adjustment. Since these quantities are invariant with time, they are put into the instrument above the worm wheel 211 where rotation of the turrets about the principal axis is introduced by time motor 230 to compensate for the apparent motion of the stars due to the passage of time.

The secondary star declination is introduced manually at a knob 6. Rotation of the knob 6 rotates the entrance prism 2 via the worm 7 and meshing worm wheel sector 8 affixed to shaft 5. The secondary start declination so introduced is recorded in counter 9 which is coupled to the knob 6.

Primary start declination is fed into the entrance prism 29 of the lower turret by similar mechanism including the primary start declination knob 33 and connected worm 31 and worm wheel sector 32. The primary start declination is recorded in the primary star declination counter 34.

The hour angle difference of the selected stars, referred to as sidereal hour angle difference or SHA difference, is introduced at the SHA difference knob 35 mounted in the lower turret. Knob 35 drives a worm 36 via three engaging spur gears. Worm 36 engages worm wheel 37 forming part of the upper turret. Thus rotation of worm 36 rotates the upper turret with respect to the lower turret. Rotation of the hour angle difference knob 35 is communicated directly to the SHA difference counter 38 where hour angle difference is read to integer degrees and minutes. The hour angle difference to tens of degrees is read off the SHA difference scale 39 affixed to the upper turret by reference to the SHA difference indicator 40 affixed to the lower turret.

Hemisphere change

The turret mount section 75 can rotate 100 degrees from zenith counterclockwise about the eyepiece axis E'W', as seen from the eyepiece end. Thus in the northern hemisphere the principal axis P'Q' of the instrument can be parallel to the polar axis of the earth (as required for alignment) at observer's stations from the north pole to 10 degrees below the equator. For observer's stations lower than 10 degrees below the equator, the instrument must be rotated in azimuth by 180 degrees so that the principal axis can again be positioned parallel to the polar axis. It is then able to operate at points from the south pole to 10 degrees above the equator. In the northern hemisphere the observer is looking from west to east and in the southern hemisphere, from east to west. The 180 degrees change in azimuth is accomplished by means of the stabilizer 500. The change is initiated by means of the hemisphere change knob 238 which connects with the stabilizer via a pair of bevels 246 and shaft 247.

When the sextant is changed to operate from the northern to the southern hemisphere, it scans the sky in the opposite direction—that is, to say, from west to east instead of from east to west—for the same sense of rotation of the turrets. Hence the GHA primary star and longitude counters must be reversed so that the readings corresponding to the same angular position of the lower turret add to a full circle (360 degrees with due regard for east and west longitude). The change from one set of dials to the other is effected by means of the hemisphere knob 229 (Fig. 2) which shifts a shutter from one to the other. A lever 244 actuated by the hemisphere change knob rotates the housing of the time motor 230 about its shaft 242 so as to reverse the resultant rotation of the shaft 243.

With chosen primary and secondary stars A and B, the sextant is prepared for use. The star declinations are set into the instrument by means of primary and secondary star declination knobs 33 and 6, and the sidereal hour angle difference of the stars is set in at the hour angle difference knob 35. Next the turrets are rotated to set in the Greenwich hour angle of star A corresponding to Greenwich civil time. For a rough setting the turrets are rotated by means of the slewing motor 231 with the selector switch 232 thrown to the left for connection of the slewing motor to GHA input. The exact setting, preferably for a near future time, is made manually with the GHA knob 215, and the time motor 230 is energized at the exact instant of time corresponding to the Greenwich hour angle so put in. Next the dead reckoning latitude and longitude positions are put in, longitude by means of the slewing motor with the selector switch 232 thrown to the right and manually by means of the longitude knob 187. The dead reckoning latitude position is inserted by means of the latitude knob 166. Lastly, the magnetic declination of the observer's position is compensated for by means of the azimuth knob 154.

With this degree of alignment the sextant is in error by the difference between the dead reckoning and true positions in longitude and latitude plus the difference between magnetic north plus a magnetic declination correction and true north. If the vector sum of the three errors is within the half field of the primary star telescope, the primary star will be visible. By manipulation of the azimuth, longitude and latitude knobs 154, 187 and 166, the primary star is brought into the center of the field as indicated by cross hairs etched on the reticle 77 in the eyepiece.

To obtain a determination of true position, it is now necessary to align the sextant by rotating its several portions about their respective axes in the amounts necessary to produce effectively a rotation of the upper and lower turrets as a unit about the optical axis of the primary telescope, keeping this optical axis parallel to the line of sight to the primary star. In the course of such a rotation the optical axis of the secondary star telescope will pass through the line of sight from the observer's position to the secondary star, at which time the two star images will appear superposed in the center of the eyepiece field.

The present invention provides means for making these rotations, i. e. of the base support section about the azimuth axis Y'Z', of the turret mount section about the eyepiece axis E'W', and of the upper and lower turrets as a unit about the principal axis P'Q', in such proportions that the sum of the three rotations is a rotation of the turrets about the primary telescope axis.

To produce effectively a rotation of the secondary telescope axis about the primary telescope axis while keeping the latter parallel with the line of sight to the primary star, the rotations about azimuth, eyepiece, and principal axes must be made in the following amounts:

In the northern hemisphere $$\Delta A = -\Delta\omega \frac{\cos DEC \cos LHA'}{\cos LAT'} \quad (3)$$

$$\Delta LAT' = \Delta\omega \cos DEC \sin LHA' \quad (4)$$

$$\Delta LONG' = -\Delta\omega \left( \frac{\cos DEC \cos LHA' \sin LAT'}{\cos LAT'} - \sin DEC \right) \quad (5)$$

In the southern hemisphere:

$$\Delta A = \Delta\omega \frac{\cos DEC \cos LHA'}{\cos LAT'} \quad (6)$$

$$\Delta LAT' = \Delta\omega \cos DEC \sin LHA' \quad (7)$$

$$\Delta LONG' = -\Delta\omega \left( \frac{\cos DEC \cos LHA' \sin LAT'}{\cos LAT'} - \sin DEC \right) \quad (8)$$

In Equations 3-8:

$\Delta A \equiv$ Incremental azimuth rotation of sextant about the vertical axis $Y'Z'$. A positive value is counterclockwise as observed from the zenith.

$\Delta LAT' \equiv$ Incremental rotation of turret mount section about eyepiece axis $E'W'$. (Latitude rotation.)

$\Delta LONG' \equiv$ Incremental rotation of lower turret about principal axis $P'Q'$. (Longitude rotation.)

$\Delta\omega \equiv$ Incremental rotation of principal axis $P'Q'$ and secondary star telescope axis about the primary star telescope axis. It is positive when in such a direction as to bring about an increase in latitude for values of LHA' from zero to 180 degrees, in accordance with Equations 4 and 7.

$LHA' \equiv$ Local hour angle of the primary star axis as indicated in the instrument, i. e. angular separation (measured east to west) of the plane formed by the principal axis $P'Q'$ and the primary star telescope axis from the plane formed by the principal axis $P'Q'$ and the indicated north-south axis of the instrument, which is perpendicular to the eyepiece axis $E'W'$ lying in the azimuth plane. This angle equals the LHA of the primary star when the instrument is in alignment.

$LAT' \equiv$ Angle between the principal axis $P'Q'$ and the azimuth plane of the sextant. When the sextant is aligned, this angle is equal to the latitude of the observer's position.

$DEC \equiv$ Declination of the primary star.

The particular form of Equations 3-8 is conditioned by the geometrical relationship of the azimuth, eyepiece, and principal axes of the sextant and the nature of the systems of celestial and terrestrial coordinates employed.

Evidently, unorganized rotation about the azimuth, eyepiece, and principal axes are not likely to hit upon the unique simultaneous solution of these equations, which differs from point to point as each of the quantities LAH' LAT' and A is varied.

To make possible an organized rotation about the azimuth, eyepiece and principal axes, there is, according to the invention, combined with the sextant means whereby the three rotations may be obtained in the relative proportions defined by Equations 3-8. A computer is built into the instrument to solve and integrate the differential equations describing the necessary relative rates of rotation about the three mechanical axes of the sextant and this computer continuously solves and integrates the equations in terms of a common variable so that an organized rotation of the various portions of the instrument about their respective mechanical axes may be effected by input of the common variable. At the same time direct linkages are maintained between the input controls for all three rotations and the counters which are geared thereto on the one hand and the elements in the instrument which actually effect the rotations on the other hand, so that the readings of the counters will not be falsified by errors in the computer train.

For the purpose of producing such organized rotations the invention contemplates a computer which may solve either all three or only two of the Equations 3-5 or 6-8. If the computer is built to solve all three applicable equations, it will operate on a single input variable manually or mechanically applied, with the operator noting by examination of the eyepiece field whether the change in the variable so put in is of the proper sign to effect the desired resultant rotations of the component parts of the sextant. If the image of the primary star has been brought to the center of the eyepiece field as part of the initial set-up procedure, variation of this input variable in the proper direction will cause the image of the secondary star to approach the center of the field. With sufficient change in that variable the secondary star image will come into coincidence with the primary star image. The operator is required only to note that he changes the computer input variable in the proper direction, and to stop when the two images coincide. Various devices known to those skilled in the art may be assembled to provide such a computer, which may be either mechanical or electronic in nature.

However the form of Equations 3-8 is not convenient for the construction of a practical computer, since the azimuth and longitude rates both increase rapidly at high values of LAT' and approach infinity as LAT' approaches 90 degrees. Accordingly, instead of employing a computer to solve Equations 3-5 or 6-8 from an input consisting of $\Delta\omega$, the incremental rotation of the secondary star telescope sextant about the primary star telescope axis, the equations are first transformed by means of the following substitution:

$$\Delta\omega = \Delta c \frac{\cos LAT' k}{\cos DEC} \quad (9)$$

Equation 9 establishes a relation between $\Delta\omega$ of Equations 5-8 and a substitute variable to be employed as input to the computer, $k$ being a constant dependent on the design of the computer.

With this substitution Equations 3-8 take respectively the following forms:

$$\Delta A = -\Delta ck \cos LHA' \quad (10)$$
$$\Delta LAT' = \Delta ck \sin LHA' \cos LAT' \quad (11)$$
$$\Delta LONG' = \Delta ck \,(\tan DEC \cos LAT' - \cos LHA' \sin LAT') \quad (12)$$
$$\Delta a = \Delta ck \cos LHA' \quad (13)$$
$$\Delta LAT' = \Delta ck \sin LHA' \cos LAT' \quad (14)$$
$$\Delta LONG' = \Delta ck \,(\tan DEC \cos LAT' - \cos LHA' \sin LAT') \quad (15)$$

In Equations 10–15 Δc does not correspond directly to the Δω of Equations 3–8, being functionally related thereto by a factor including LAT', as indicated in Equation 9. However the relative relationship of ΔA, ΔLAT' and ΔLONG' to one another is the same in Equations 10–15 as in Equations 3–8. Accordingly, a computer solving Equations 10–12 or 13–15 from a Δc input will generate the required relative rates of rotation about the azimuth, eyepiece and longitude axes, although the absolute values of these rates will differ from those generated from a Δω input, the difference in the absolute rates being given by Equation 9.

With the substitution of the quantity Δc defined by Equation 9, Equations 3–4 and 6–7 are transformed into Equations 10–11 and 13–14, respectively. This substitution not only avoids the difficulty of infinite ratios but results in two pairs of equations, Nos. 10–11 and 13–14 which are much simpler than those from which they are derived. Equations 12 and 15, on the other hand, remain complicated in form. Accordingly, a great simplification in the construction of the computer is effected if it is designed to solve Equations 3 and 4 or 6 and 7 only, leaving the applicable Equation 5 or 8 to be solved by the operator. The operator solves this equation by manipulating an input control which varies the longitude setting of the instrument (the angular position of the turrets about the principal axis) and by observing the position of the primary star image. Since the latitude and azimuth rates are completely determined by a computer which solves and integrates Equations 3 and 4 or 6 and 7, the only source of error which can inhere in the rotation of the turrets about the primary star telescope axis must lie in the longitude variation. To keep the primary star image in the center of the field therefore the operator need only manipulate the longitude input control. To bring the secondary star image into superposition with that of the primary star in the center of the eyepiece field, he need therefore only rotate the computer input control in the direction which moves the secondary star image towards rather than away from the primary star image and rotate the longitude input control so as to keep the primary star image in the center of the field.

The sextant of Fig. 2 being described as an illustrative embodiment of my invention includes a mechanical computer which solves and integrates continuously Equations 10 and 11 or 13 and 14 from an input Δc. The azimuth output of this computer is added to the azimuth gear train of the sextant, and the latitude output is added to the latitude gear train. Thus the computer determines for every instantaneous value of LHA' and LAT' the increments of azimuth and latitude rotations which must be added for increments of the rotation Δc which are put into the computer manually at a knob 350, Fig. 2. The solution of the applicable Equation 12 or 15 is effected manually by introducing at the longitude knob 187 such increments of longitude as are, for given increments of the arbitrary rotation put in, necessary to keep the primary star image in the center of the eyepiece field. Thus the observer, by manipulating the computer and longitude knobs 350 and 187, at once keeps the primary star image in the center of the eyepiece field and brings the secondary star image into superposition therewith.

The solution of Equations 10 and 11 or 13 and 14 is thus a necessary but not a sufficient condition to the rotation of the turrets about the axis of the primary telescope. A sufficient condition requires the solution of Equation 12 or 15, which is effected manually.

One sense of rotation of the computer knob will be seen to bring the secondary star image toward the center of the field while the other sense of rotation drives it towards the edge. In the alignment procedure a distinction between the primary and secondary telescope fields of view is made by the use of a colored filter controlled by a lever 10 (Fig. 2). The lever 10 is used to introduce the filter in the field of view of the secondary star telescope above the beam splitter 26 so that when it is inserted, the secondary star image will appear colored while the primary star image remains white. The computer of the embodiment of Figs. 2 and 3 will now be described.

*The computer*

Referring first to Figs. 3 and 4, the computer consists of the ball and disk integrators 301 and 325, the Scotch yokes 312 and 338 and the gearing section between them which receives the LHA' and LAT' inputs from the instantaneous angular positions of the lower turret about the principal axis P'Q' and of the turret mount section about the eyepiece axis E'W'. The computer is shown as a unit in Fig. 4.

The azimuth ball and disk integrator 301 and the azimuth Scotch yoke 312 are shown in Fig. 5. Together these elements provide a continuous solution to and integration of Equation 10 or Equation 13, depending on the setting of the hemisphere change knob 238.

The Scotch yoke 312 includes a slide 317 and a disk 313 carrying a crank pin 314. The disk is rotated in accordance with LHA' by the gearing section about an axis fixed in the base support. The slide is mounted in guides for rectilinear motion in a direction perpendicular to the length of its slot 315 which engages the crank pin 314. The position of the slide is evidently a sine or cosine function of LHA', the angular position of the disk, the constant of proportionality being the radial distance of the crank pin from the center of the disk. Since a cosine function is wanted, the disk is assembled so that for $LHA'=0°$ the crank pin 314 and the center of the disk 313 are collinear with the length of the slide 317. The constant of proportionality is taken into the design so that the position of the slide is cos $LHA'$.

The azimuth integrator includes a disk 304 rotated by the gearing section in accordance with Δc. A drum 305 is mounted for rotation about an axis perpendicular to and intersecting the axis of rotation of the disk 304, and a ball cage 302 is supported in guides not shown between the disk and the drum for motion parallel to the drum. The ball cage encloses two balls 303 of such diameter that one contacts the disk, the other the drum, and each contacts the other. The line of centers of the balls is kept perpendicular to the surface of the disk, and the balls are supported by auxiliary rollers which permit free rotation thereof. Accordingly, the balls transmit to the drum the linear motion of the point of contact between the disk and the ball which makes contact therewith. A linkage between the slide 317 and the ball cage is adjusted so that the ball next the disk contacts the center thereof when the slot 315 is centered on the center of the Scotch yoke disk 313.

Referring to Fig. 3, LHA' is fed into the gearing section from the spider 192 of differential 191 via shaft 195, bevel gears 356 and the shaft 357. Shaft 195 to which the spider is pinned extends down through the hollow shaft 190 to connect with bevel gears 356. The rotation of the spider 192 is in accordance with LHA' because it consists of the difference between the GHA' and LONG' inputs.

The transmission of LHA' through the gearing section to the azimuth Scotch yoke disk 313 is as follows (Fig. 4): Worm 401, fast to shaft 357, rotates its mating worm wheel 402 which is fast to the connecting spur gear 403 and the internal ring gear 404. Spur gear 403 communicates LHA' to its meshing spur gear 405. Shaft 406 is driven by spur gear 405 and passes through differential 410 to a spur gear 411 which meshes with a spur gear 412 to which is fastened the azimuth Scotch yoke disk 313.

$\Delta c$ is transmitted to the azimuth integrator disk 304 by shaft 355, driven from the computer knob 350 (Fig. 3) via bevel gears 351, shaft 352, bevel gears 353 and spur gears 354.

With LHA' fed to the azimuth Scotch yoke disk and with $\Delta c$ fed to the azimuth integrator disk, the rotation of the integrator drum 305 may be analyzed as follows: If R is the radius of the drum, $z$, its angular position, $r$ the instantaneous distance of the point of contact of the ball 303 with the disk 304 from the center of the disk, the relation between the rotations $\Delta c$ of the disk and $\Delta z$ of the drum is $$R\Delta z = r\Delta c$$

But $r$ equals cos $LHA'$, and R can be taken into the design so that the relation can be written:

$$\Delta z = \cos LHA' \Delta c$$

or $$kz = \int_0^c \cos LHA' dc = A \qquad (16)$$

according to Equations 10 and 13.

The shaft 306 affixed to the drum 305 therefore transmits to worm 164 (Fig. 3) and thence to differential 156 the increments of azimuth rotation necessary to keep the primary star image in the center of the telescope eyepiece.

Increments of latitude rotation necessary to keep the primary star image in the center of the eyepiece are developed in the latitude ball and disk integrator 325, the latitude Scotch yoke 338, and in the gearing section which develops cos $LAT'$ sin $LHA'$ therefor.

These devices thus solve Equation 11 or 14. The latitude integrator receives as input from shaft 355 the same increments of rotation $\Delta c$ as are transmitted to the azimuth integrator. This rotation is applied to the latitude integrator disk 326. The slide 340 of latitude Scotch yoke 338 is coupled to the latitude integrator ball cage 327 and shifts the latter radially of the disk 326 as it is moved in guides (not shown) along a path perpendicular to its slot 330.

The gearing section develops for a crank pin 413 which engages the slot 330 a motion whose component in the direction perpendicular to the slot is sin $LHA'$ cos $LAT'$. This functioning of the gearing section will be next described.

As explained above, internal ring 404 rotates with LHA'. Coaxial with the gear 404 is a shaft 414 (Fig. 4) passing through worm wheel 402 and gear 403 to a spur gear 415 to which it is pinned. Gear 415 meshes with a gear 416 which is connected via a hollow shaft 417 with the south end gear 407 of differential 410. The spider of differential 410 is rotated with LHA' by its connection with shaft 406. On the other hand, the north end gear 409 is rotated with LAT' from the arcuate rack 180 (Fig. 9) in sector 179. Rack 180 transmits LAT' to a pinion 181, shaft 418, worm 419, worm wheel 420, shaft 421, spur gears 422, and thence to a hollow shaft 423 and to north end gear 409. The south end gear 407 accordingly turns with LHA' and LAT', the sum of the inputs to differential 410.

The shaft 414 is rotated with $LHA' + LAT'$. Shaft 414 carries at its south end adjacent the ring gear 404 a crank 424, displaced from the shaft by one quarter of the pitch diameter of the ring gear 404. Journaled on the crank 424 is a planet gear 425, of one half the pitch diameter of the ring gear. The crank pin 413 which engages the slot 330 of the latitude Scotch yoke slide 340 is centered on the pitch circle of the planet gear 425.

The arrangement of the crank pin 413 is illustrated in Fig. 6, which is an end elevation of the latitude Scotch yoke and connected elements of the gearing section corresponding to adjustment of the instrument for the values $LAT' = 90°$ and $LHA' = 0°$.

The linkages and gear meshes are so established upon assembly of the instrument that when $LAT' = 90°$ (axis P'Q' parallel to the azimuth axis Y'Z') and when $LHA' = 0°$ (the plane defined by the primary star telescope axis and the axis P'Q' perpendicular to the eyepiece axis), the crank 424 defines with the crank shaft 414 a horizontal plane parallel to the motion of the latitude Scotch yoke slide 340, and the crank pin 413 is at the center of the ring gear 404 and collinear with the shaft 414. In addition, the linkage of the latitude Scotch yoke slide to the integrator ball cage 327 is so adjusted that with the slot 330 in line with the shaft 414, the ball cage 327 bring the point of contact between the balls 328 and the integrator disk 326 to the center of the latter.

Evidently, so long as $LAT' = 90°$, variations in LHA' only result in no displacement of the crank pin 413. The planet gear 425 rotates bodily with the internal ring gear 404 about the shaft 414 and undergoes no change of mesh with the ring gear 404, and the crank pin 413 remains at the center of the ring gear. Thus at all times when $LAT' = 90°$, the output of the latitude integrator is zero.

Any change in LAT' will cause the shaft 414 to rotate relative to the ring gear 404, rolling the planet gear 425 about the inside of the ring gear. In such case the crank pin 413 will execute rectilinear motion along a path passing through the center of the ring gear and perpendicular to the line joining the center of the ring gear and the position occupied by the crank 424 when $LAT' = 90°$.

Thus when $LHA' = 0°$, the path of motion of the crank pin 413 defined by a variation in LAT' is in the vertical plane containing the shaft 414 and passing through the center of the ring gear. For this reason there is no motion imparted to the latitude Scotch yoke 338 regardless of the value of LAT', so long as LHA' is equal to zero. In this case also there is no output from the integrator. This is shown in Fig. 7, where the position of the ring gear, planet gear and crank pin is illustrated for three values of LAT', LHA' remaining zero.

When LHA' is not equal to zero, variations in LAT' cause the crank pin 413 to follow a path inclined to the vertical by the angle LHA'. The component of the crank pin's motion in the horizontal is therefore its motion along such inclined path multiplied by sin LHA'. The motion of the crank pin along the inclined path, whatever the orientation of the path established by LHA', is cos $LAT'$ times the diameter of the planet gear pitch circle. Since the pitch diameter of the planet gear is a constant, it may be taken into the design so that the actual displacement of the crank pin with respect to the ring gear may be written cos $LAT'$. The horizontal component of the pin's motion is therefore sin $LHA'$ cos $LAT'$, and this is the motion communicated by the latitude Scotch yoke to the ball cage of the latitude integrator. The position of the crank pin 413 and the resulting displacement of the slide 340 are illustrated diagrammatically in Fig. 8 for four values of LAT', all with LHA' having the value 45 degrees.

Since the latitude integrator receives $\Delta c$ on its disk 326 and sin $LHA'$ cos $LAT'$ on its ball cage 327, the rotation of its drum 331 is $$kz = \frac{1}{R}\int_0^c \sin LHA' \cos LAT' dc \qquad (17)$$

In this expression also R, the radius of the drum 331, is a constant which may be taken into the design. The value of the integral expressed in Equation 17 is therefore LAT', the left-hand side of Equation 11 or 14 after integration. This output from the latitude integrator is communicated via shaft 329 to the worm 175 and thence to the upper end gear of the differential 167. The correction in latitude required by Equation 11 or 14 is therefore reintroduced through the worm 175 to the sector 179.

Viewed in another light the ring gear 404, the shaft 414 and its planet gear 425 and crank pin 413 provide with the slide 340 a compound Scotch yoke for the control of the latitude integrator ball cage.

The radius of action of the pin 413 in this Scotch yoke, instead of being fixed as in the azimuth Scotch yoke, is dependent on the value of LAT' and on the consequent angular relation between the planetary and ring gears. Given this radius of action, i. e. the distance of the crank pin 413 from the center of the ring gear, the displacement of the slide is sin $LHA'$ times this radius of action. The function is a sine rather than a cosine since as shown in Fig. 7, when the crank pin 413 is in the vertical through the center of rotation of the ring gear, the value of LHA' determining the position of the ring gear is zero.

The value of the radius of action of the pin 413 is $R$ cos $LAT'$ where R is the diameter of the planet gear. The factor of proportionality is the diameter rather than the radius of the planetary gear because rotation of the planet gear involves motion of the center of the planet gear with regard to the ring gear as well as of the crank pin 413 with respect to the center of the planet gear.

The description of the embodiment illustrated in Fig. 2 has assumed for clarity particular forms for the mechanical elements by which the turrets, the turret mount section and the base support section are interconnected. Numerous alternative gear trains are available. As previously stated the invention is not limited to the particular form of computer which has been described.

I claim:

1. A two star sextant including a base mounted for rotation about an azimuth axis; a turret mount mounted for rotation about a latitude axis perpendicular to the azimuth axis; two turrets mounted for coaxial rotation about a longitude axis perpendicular to the latitude axis; drive means to separate drive the base about the azimuth axis, to drive the turret mount about the latitude axis, and to drive the two turrets about the longitude axis; two telescopes having a common eyepiece and having each an objective mounted in one of the two turrets; means to incline the axes of the telescopes in their object space to each other in declination measured in planes containing the longitude axis and in hour angle measured between planes containing the longitude axis and the respective telescope axes; a computer adapted to derive from an arbitrary rotation put into the computer the relative rates of rotation of the base about the azimuth axis and of the turret mount about the latitude axis which are sufficient, in conjunction with rotation at an appropriate rate of turrets about the longitude axis, to rotate the two turrets as a unit about the axis of one of the telescopes without changing the orientation of the axis of the said one telescope, and separate means to couple the computer to said azimuth and the latitude axis drive means.

2. A multiple-star sextant comprising azimuth, latitude and longitude components mounted for rotation respectively about an azimuth axis, a latitude axis perpendicular to the azimuth axis, and a longitude axis perpendicular to the latitude axis, a computer adapted to generate as functions of an arbitrary independent variable the relative rates of rotation of the azimuth and latitude components about the azimuth and latitude axes sufficient, in conjunction with rotation at an appropriate rate of the longitude component about the longitude axis, to produce an effective rotation of the longitude component about a chosen axis inclined to the longitude axis, and separate means coupling the computer to the azimuth and latitude components.

3. A multiple-star sextant including two telescopes having a common eyepiece and separate deflecting means adapted to incline the lines of sight of the telescopes in their object spaces to each other in declination and hour angle referred to a longitude axis about which the deflecting means are jointly and severally rotatable, a mount supporting the telescopes for joint rotation about a latitude axis perpendicular to the longitude axis, and a base supporting the mount for rotation about an azimuth axis perpendicular to the latitude axis, a computer adapted to derive from an arbitrary rotation the relative rates of rotation of the base about the azimuth axis and of the mount about the latitude axis sufficient, in conjunction with rotation at an appropriate rate of the deflecting means jointly about the longitude axis, to rotate the deflecting means together about the line of sight of one of the telescopes without changing the orientation of said line of sight, and two drive means coupled respectively to the base and to the mount, said drive means receiving as input signals each one of the rates of rotation derived by the computer.

4. A multiple-star sextant including two telescopes having a common eyepiece and separate deflecting means adapted to incline the lines of sight of the telescopes in their object spaces to each other in declination measured in planes containing a longitude axis about which the deflecting means are jointly and severally rotatable and in hour angle measured about the longitude axis, a mount supporting the telescopes for joint rotation about a latitude axis perpendicular to the longitude axis, a base supporting the mount for rotation about an azimuth axis perpendicular to the latitude axis, a computer adapted to derive from an arbitrary rotation the relative rates of rotation of the base about the azimuth axis and of the mount about the latitude axis which are sufficient, in conjunction with rotation at an appropriate rate of the deflecting means jointly about the longitude axis, to rotate the deflecting means together about the line of sight of one of the telescopes without changing the orientation of said line of sight, and two drive means coupled respectively to the base and to the mount, said drive means receiving as input signals each one of the rates of rotation derived by the computer.

5. A two star sextant including a base mounted for rotation about an azimuth axis; a turret mount mounted for rotation about a latitude axis perpendicular to the azimuth axis; two turrets mounted for coaxial rotation about a longitude axis perpendicular to the latitude axis; separate drive means to drive the base about the azimuth axis, to drive the turret mount about the latitude axis, and to drive the two turrets about the longitude axis; two telescopes having a common eyepiece and having each an objective mounted in one of the two turrets; means to incline the axes of the telescopes in their object space to each other in declination measured in planes containing the longitude axis and in hour angle measured between planes containing the longitude axis and the respective telescope axes; a computer for deriving from an arbitrary rotation put into the computer the relative rates of rotation of the base about the azimuth axis and of the turret mount about the latitude axis which are required to rotate the two turrets as a unit about the axis of one of the telescopes without changing the orientation of the axis of the said one telescope; and means linking the output of the computer with the said drive means, whereby supply in the proper sign of the arbitrary rotation to the computer in conjunction with the supply of appropriate rotation to said longitude axis drive means results in rotation of the two turrets about the axis of one of the telescopes.

6. A two star sextant including a base mounted for rotation about an azimuth axis; a turret mount mounted for rotation about a latitude axis perpendicular to the azimuth axis; two turrets mounted for coaxial rotation about a longitude axis perpendicular to the latitude axis; separate drive means to drive the base about the azimuth axis, to drive the turret mount about the latitude axis, and to drive the two turrets about the longitude axis; two telescopes having a common eyepiece and having each an objective mounted respectively in one of the said turrets; means to incline the axes of the telescopes in their object space to each other in declination measured in planes containing the longitude axis and in hour angle measured between planes containing the longitude axis and the respective telescope axes; a computer for deriving from an arbitrary rotation put into the computer the relative rates of rotation of the base about the azimuth axis and of the turret mount about the latitude axis which are sufficient, in conjunction with a suitably proportioned rate of rotation of the turrets about the longitude axis separately applied, to rotate the two turrets as a unit about the axis of one of the telescopes without changing the orientation of the axis of the said one telescope, and means linking the output of the computer with said azimuth axis and latitude axis drive means.

7. A multiple-star sextant comprising two telescopes having separate deflecting means adapted to incline the lines of sight of the telescopes in their object spaces to each other in declination and hour angle referred to a longitude axis, a mount supporting the telescopes for joint rotation about a latitude axis perpendicular to the longitude axis, a base supporting the mount for rotation about an azimuth axis perpendicular to the latitude axis, a computer for deriving from an arbitrary rotation the relative rates of rotation of the base about the azimuth axis and of the mount about the latitude axis sufficient, in conjunction with rotation at an appropriate rate of the deflecting means jointly about the longitudinal axis, to rotate the deflecting means together about the line of sight of one of the telescopes without changing the orientation of said line of sight, and separate drive means coupled to the base and mount to effect rotations thereof about the azimuth and latitude axes, said drive means receiving as inputs respectively the azimuth and latitude rotation rates developed by the computer.

8. A two star sextant including a base mounted for rotation about an azimuth axis; a turret mount mounted for rotation about a latitude axis perpendicular to the azimuth axis; two turrets mounted for coaxial rotation about a longitude axis perpendicular to the latitude axis; separate drive means to drive the base about the azimuth axis, to drive the turret mount about the latitude axis, and to drive the two turrets about the longitude axis; two telescopes having a common eyepiece and having each an objective mounted in one of the turrets; means to incline the axes of the telescopes in their object space to each other in declination measured in planes containing the longitude axis and in hour angle measured between planes containing the longitude axis and the respective telescope axes, a computer for deriving from an arbitrary rotation put into the computer the relative rates of rotation of the base about the azimuth axis and of the turret mount about the latitude axis which are sufficient, in conjunction with a suitably proportioned rate of rotation of the turrets about the longitude axis separately applied, to rotate the two turrets as a unit about the axis of one of the said telescopes without changing the orientation of the axis of the said one telescope, said computer comprising an azimuth ball and disk integrator, said azimuth ball and disk integrator including a disk, a roller and a ball cage coupled therebetween, means to rotate the disk of the azimuth integrator in proportion to the arbitrary rotation, an azimuth scotch yoke having its slide coupled to the azimuth integrator ball cage, an azimuth crank coupled to the azimuth scotch yoke slide, means to rotate the azimuth crank in proportion to the rotation of the turrets about the longitude axis, means to add the rotation of the azimuth integrator roller as an input to the azimuth drive, a latitude ball and disk integrator, said latitude ball and disk integrator including a disk, a roller and a ball cage coupled therebetween, means to rotate the disk of the latitude integrator in proportion to the arbitrary rotation, a latitude scotch yoke having its slide coupled to the latitude integrator ball cage, a latitude crank pin engaging the slot of the latitude scotch yoke slide, a planet gear carrying the latitude crank pin on its pitch circle, a latitude crank having a throw of one half the planet gear pitch diameter and on which the planet gear is journaled, an internal ring gear meshing with the planet gear and of twice the planet gear pitch diameter, means to rotate the ring gear in proportion to the rotation of the turrets about the longitude axis, means to rotate the latitude crank in proportion to the algebraic sum of the rotations of the turrets about the longitude axis and of the turret mount about the latitude axis, and means to add the rotation of the latitude integrator roller as an input to the latitude drive.

9. A multiple-star sextant comprising components mounted for rotation respectively about an azimuth axis, a latitude axis perpendicular to the azimuth axis, and a longitude axis perpendicular to the latitude axis, a computer for generating as functions of an arbitrary independent variable the relative rates of rotation about the azimuth and latitude axes sufficient, in conjunction with rotation at an appropriate rate of the deflecting means jointly about the longitude axis, to produce an effective rotation of the longitude component about a chosen axis skew to the azimuth, latitude and longitude axes, said computer comprising an azimuth ball and disk integrator for generating the azimuth rotation, said azimuth integrator including a disk, a roller and a ball cage coupled therebetween, means to apply to the disk of the azimuth integrator the arbitrary independent variable, means to apply to the ball cage of the azimuth integrator the cosine of the angular position of the longitude component about the longitude axis, means to drive the azimuth component about the azimuth axis in accordance with the rotation of the azimuth integrator roller, a latitude ball and disk integrator for generating the latitude rotation, said latitude integrator including a disk, a roller and a ball cage coupled therebetween, means to apply the arbitrary independent variable to the disk of the latitude integrator, means to apply to the ball cage of the latitude integrator the product of the sine of the angular position of the longitude component about the longitude axis multiplied by the cosine of the angular position of the latitude component about the latitude axis, and means to drive the latitude component about the latitude axis in accordance with the rotation of the latitude integrator roller.

10. A multiple-star sextant comprising azimuth, latitude and longitude components mounted for rotation respectively about an azimuth axis, a latitude axis perpendicular to the azimuth axis, and a longitude axis perpendicular to the latitude axis, a computer for generating as functions of an arbitrary independent variable the relative rates of rotation about the azimuth and latitude axes sufficient, in conjunction with a properly proportioned rotation of the longitude component about the longitude axis, to produce a rotation of the longitude component about a chosen axis inclined to the longitude axis, and separate means coupling the outputs of the computer to the azimuth and latitude components, said computer comprising an azimuth ball and disk integrator for generating the azimuth rotation, said azimuth integrator including a disk, a roller and a ball cage coupled therebetween, means to apply to the disk of the azimuth integrator the arbitrary independent variable, means to move the ball cage of the azimuth integrator in proportion to the cosine of the angular position of the longitude component about the longitude axis, a latitude ball and disk integrator for generating the latitude rotation, said latitude integrator including a disk, a roller and a ball cage coupled therebetween, means to apply the arbitrary independent variable to the disk of the latitude integrator, and means to move the ball cage of the latitude integrator in proportion to the product of the sine of the angular position of the longitude component about the longitude axis multiplied by the cosine of the angular position of the latitude component about the latitude axis.

11. In a multiple-star sextant including two telescopes having a common eyepiece and separate deflecting means adapted to incline the lines of sight of the telescopes in their object spaces to each other in declination and hour angle referred to a longitude axis about which the deflecting means are jointly and severally rotatable, a mount supporting the telescopes for joint rotation about a latitude axis perpendicular to the longitude axis, and a base supporting the mount for rotation about an azimuth axis perpendicular to the latitude axis, the improvement which comprises a computer for deriving from an arbitrary rotation the relative rates of rotation of the base about the azimuth axis and of the mount about the latitude axis sufficient, in conjunction with rotation at an appropriate rate of the deflecting means jointly about the longitude axis, to rotate the deflecting means together about the line of sight of one of the telescopes without changing the orientation of said line of sight, said computer comprising an azimuth ball and disk integrator including a disk, a roller and a ball cage coupled therebetween, means to rotate the disk of the azimuth integrator in proportion to the arbitrary rotation, means for deriving from a rotation proportional to the rotation of the deflecting means about the longitude axis a first linear motion proportional to the cosine of the said rotation about the longitude axis, means to move the ball cage of the azimuth integrator proportionally to the said first linear motion, means to rotate the base about the azimuth axis proportionally to the rotation of the azimuth integrator roller, a latitude ball and disk integrator including a disk, a roller and a ball cage coupled therebetween, means to rotate the disk of the latitude integrator in proportion to the arbitrary rotation, means to derive a second linear motion proportional to the product of the sine of the angular orientation of the deflecting means about the longitude axis multiplied by the cosine of the orientation of the mount about the latitude axis, means to move the latitude integrator ball cage proportionally to the said second linear motion, and means to rotate the mount about the latitude axis in proportion to the rotation of the latitude integrator roller.

12. In a multiple-star sextant including two telescopes having a common eyepiece and separate deflecting means adapted to incline the lines of sight of the telescopes in their object spaces to each other in declination and hour angle referred to a longitude axis about which the deflecting means are jointly and severally rotatable, a mount supporting the telescopes for joint rotation about a latitude axis perpendicular to the longitude axis, and a base supporting the mount for rotation about an azimuth axis perpendicular to the latitude axis, the improvement which comprises a computer for deriving from an arbitrary rotation the relative rates of rotation of the base about the azimuth axis and of the mount about the latitude axis sufficient, in conjunction with rotation at an appropriate rate of the deflecting means jointly about the longitude axis, to rotate the deflecting means together about the line of sight of one of the telescopes, said computer comprising an azimuth ball and disk integrator including a disk, a roller and a ball cage coupled therebetween, means to rotate the disk of the azimuth integrator in proportion to the arbitrary rotation, an azimuth crank whose crank shaft is coupled to the deflecting means as regards their joint rotation about the longitude axis, an azimuth slide coupled to the azimuth crank for linear motion in a first given direction according to the projection of the motion of the azimuth crank on the first given direction, a coupling between the azimuth slide and the azimuth integrator ball cage, means to rotate the base about the azimuth axis according to the rotation of the azimuth integrator roller, a latitude ball and disk integrator including a disk, a roller and a ball cage coupled therebetween, means to rotate the disk of the latitude integrator in proportion to the arbitrary rotation, a ring gear linked in rotation to the crank shaft of the azimuth crank, a latitude crank shaft having a latitude crank eccentrically mounted thereon, means to rotate the latitude crank shaft in proportion to the sum of the rotations of the deflecting elements jointly about the longitude axis and of the rotation of the mount about the latitude axis, a planet gear having one half the pitch diameter of the ring gear journaled on the latitude crank for mesh with the ring gear, a crank pin affixed to the pitch circle of the planet gear, a latitude slide coupled to the crank pin for linear motion in a second given direction according to the projection of the motion of the crank pin on the second given direction, a coupling between the latitude slide and the latitude integrator ball cage, and means to rotate the mount about the latitude axis according to the rotation of the latitude integrator roller.

13. A multiple-star sextant comprising two telescopes having a common eyepiece and means to incline their lines of sight to each other in declination measured in planes containing a longitude axis and in hour angle measured between planes containing the said axis and the lines of sight of the telescopes, means to support the telescopes for joint rotation about the longitude axis, about a latitude axis perpendicular to the longitude axis, and about an azimuth axis perpendicular to the latitude axis, means for deriving from an arbitrary rotation the relative rates of rotation of the telescopes about the latitude and azimuth axes sufficient to produce in conjunction with a suitably proportioned rotation thereof about the longitude axis a rotation of the telescopes about the line of sight of one thereof, said last-named means comprising an azimuth integrator employing as integrand the product of the arbitrary rotation multiplied by the cosine of the angular position of the telescopes about the longitude axis, and a latitude integrator employing as integrand the product of the arbitrary rotation multiplied by the sine of the angular position of the telescopes about the longitude axis and by the cosine of the angular position of the telescopes about the latitude axis, and separate drive means linked between the azimuth and latitude integrators and the means supporting the telescopes for rotation about the azimuth and latitude axes, respectively.

14. A multiple-star sextant comprising a base arranged for rotation about an azimuth axis, a mount supported from the base for rotation about a latitude axis in the base perpendicular to the azimuth axis, two telescopes supported from the mount and having separate deflecting means adapted to incline their lines of sight to each other in declination measured in planes containing a longitude axis perpendicular to the latitude axis and in hour angle measured between planes containing the longitude axis and the lines of sight of the telescopes, means to rotate the said deflecting means jointly about the longitude axis, a computer which derives from an arbitrary rotation the relative rates of rotation of the base about the azimuth axis and of the mount about the latitude axis sufficient, in conjunction with rotation at an appropriate rate of the deflecting means jointly about the longitude axis, to rotate the said deflecting means jointly about the line of sight of one of the telescopes, said computer comprising an azimuth integrator employing as integrand the product of the arbitrary rotation multiplied by the cosine of the angular position of the telescopes about the longitude axis, and a latitude integrator employing as integrand the product of the arbitrary rotation multiplied by the sine of the angular position of the telescopes about the longitude axis and by the cosine of the angular position of the telescopes about the latitude axis, and separate drive means linking the azimuth and latitude integrators to the base and mount, respectively.

15. A two-star sextant comprising a base mounted for rotation about a first axis; a turret mount supported on the base for rotation with respect to the base about a second axis; two optical axis-defining means supported on the turret mount for rotation with respect to each other and with respect to the turret mount about a third axis; first, second and third drive means to drive the base, turret mount, and optical axis-defining means together about said first, second and third axes respectively; two telescopes associated each with one of said optical axis-defining means; and two variable ratio drives receiving a common input rotation and linked each to a separate one of said drive means; said variable ratio drives developing the relative rates of rotation of said two drive means sufficient, in conjunction with rotation at an appropriate rate of the other of said drive means, to rotate said two optical axis-defining means together about the optical axis of one of said telescopes as defined by one of said optical axis-defining means without changing the orientation of the optical axis of said one telescope.

16. A two-star sextant comprising a base mounted for rotation about a first axis; a turret mount supported on the base for rotation with respect to the base about a second axis; two turrets supported on the turret mount for rotation with respect to each other and with respect to the turret mount about a third axis; three separate drive means to drive the base, turret mount and turrets about said first, second and third axes respectively; two telescopes; separate means one in each of said turrets to incline the axes of said telescopes in their object space to each other in declination and hour angle; and two variable ratio drives receiving a common input rotation and linked each to one of said drive means; said variable ratio drives developing the relative rates of rotation of the said two drive means sufficient, in conjunction with rotation at an appropriate rate of the other of said separate drive means, to rotate the turrets as a unit about the axis of one of the telescopes without changing the orientation of the axis of said one telescope.

References Cited in the file of this patent

UNITED STATES PATENTS

| Number | Name | Date |
|---|---|---|
| 1,849,611 | Bussei | Mar. 15, 1932 |
| 2,316,466 | Storer | Apr. 13, 1943 |
| 2,371,606 | Chaffee | Mar. 20, 1945 |
| 2,397,532 | Chaffee | Apr. 2, 1946 |
| 2,428,870 | Essex | Oct. 14, 1947 |
| 2,471,686 | Hiltner | May 31, 1949 |

FOREIGN PATENTS

| Number | Country | Date |
|---|---|---|
| 840,326 | France | Jan. 16, 1939 |
| 610,561 | Great Britain | Oct. 18, 1948 |